L. HAVERSTICK.
Horse Hay-Fork.
No. 85,739
Patented Jan. 12, 1868.
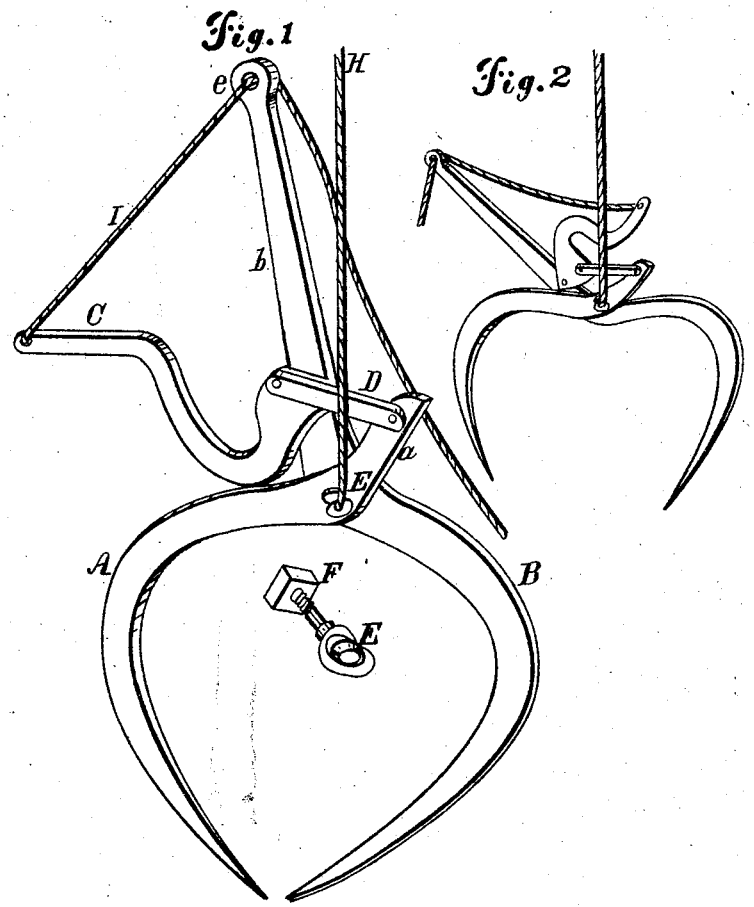

United States Patent Office.

LEVI HAVERSTICK, OF MANOR TOWNSHIP, PENNSYLVANIA, ASSIGNOR TO HIMSELF AND ABRAHAM W. SHUMAN, OF SAME PLACE.

Letters Patent No. 85,739, dated January 12, 1869; antedated December 26, 1868.

---

IMPROVEMENT IN HORSE HAY-FORKS.

---

The Schedule referred to in these Letters Patent and making part of the same.

---

*To all whom it may concern:*

Be it known that I, LEVI HAVERSTICK, of Manor township, in the county of Lancaster, and State of Pennsylvania, have invented a new and useful combination on Horse Hay-Forks; and I do hereby declare that the following is a full, clear, and exact description of the construction and operation of the same, reference being had to the accompanying drawings, making a part of this specification, in which—

Figure 1 is a perspective view of the fork when closed.

Figure 2, the same, on a reduced scale, with the tines separated.

The nature of my invention consists in providing a self-locking-lever arrangement that will not unship in hoisting by striking a beam or object; also, in the mode of attaching the hoisting-rope so as to obviate the objections found against contrivances heretofore in use when the hoisting-rope is attached to an extended arm or top of a central column or tine-support.

To enable others skilled in the art to make and use my invention, I will proceed to describe its construction and operation.

Fig. 1 clearly shows the hook or tine A, with its short arm $a$, as also the hook or tine B, with it elongated arm $b$, terminated with an eye, $e$, in which a pulley may be inserted for the unshifting-rope I.

The bent lever C, with its broad base, moves on a pin in the arm $b$, and said lever is connected with the short arm $a$ by a toggle-joint, D, moving on a pin on said arm $a$, and also on a pin in the enlarged heel of the lever C. This lever has an eye for the cord or rope I.

The two tines are held together by a pivot-bolt and screw-nut, F.

This bolt has an eye, E, for the main or hoisting-rope H.

The same arms, lever, and toggle-joint, and hoisting-rope connections will answer equally well when two hooks or tines are used, connected to the arms below the pivot-bolt mentioned.

The operation is such that when the crooked lever C is pressed down upon the curved tine A, it effectually locks the tines, and cannot be unlocked while hoisting upward, no matter how hard it may strike against any object, as it is so arranged as to act only in the contrary direction, by passing the cord I, attached to the lever, through the eye $e$, on the long arm $b$, so that in unshifting, the lever-arm C is raised upward. When turned over the centre, the pressure or weight of the hay will throw the lever-arm to the opposite side, and open the tines so as to dislodge the hay at once and freely, when the empty hook will swing freely, and can be easily returned for a fresh load.

The advantage in affixing the hoisting-rope in the manner shown, is in enabling the operator to draw the same back on the hay-mow from under the tackle with more ease, and in various ways it facilitates the operation of the same.

I am aware that in patent No. 47,982, May 30, 1865, two levers for toggle-arms are combined with hinged or tined jaws, and also placing the hoisting-ring out of the centre of the fork, with a view to facilitate the opening and closing of the fork, but the tines are differently constructed, and the lever and toggle-joint or bar operate in a reverse manner, so that I do not claim such a construction and operation shown or claimed in said patent, nor the subsequent patent of the same party, No. 48,029, where he introduces a hand-lever C.

It will be noticed that the toggle-joint or lever D on my fork is connected with the short arm $a$ of the tine A, and also with the enlarged heel of the lever C, the lever C having its fulcrum on a separate pin on the extended arm $b$ of the tine B, and operates in a different manner, while the hoisting-rope is connected with the fulcrum or pivot of the jaws or tines. Hence, my construction differs essentially in very important points.

Years of experimenting with all kinds of hooks has satisfied me that farmers require a hook better adapted to meet the diversity of contingencies, which I have aimed to accomplish.

What I claim as my invention, and desire to secure by Letters Patent, is—

The fastening or connecting-bolt E, with its eye, for the attachment of the hoisting-rope, in combination with the extended arm $b$, with its eye, for the trigger-rope, all arranged and operating in the manner and for the purpose specified.

LEVI HAVERSTICK.

Witnesses:
SAMUEL LIVELY,
JNO. A. BRUSH.